United States Patent
Huang et al.

(10) Patent No.: US 8,291,549 B2
(45) Date of Patent: Oct. 23, 2012

(54) HINGE MECHANISM

(75) Inventors: Lian-Cheng Huang, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 108 days.

(21) Appl. No.: 12/915,253

(22) Filed: Oct. 29, 2010

(65) Prior Publication Data

US 2011/0232035 A1   Sep. 29, 2011

(30) Foreign Application Priority Data

Mar. 24, 2010  (CN) .......................... 2010 1 0131461

(51) Int. Cl.
*E05F 1/08* (2006.01)

(52) U.S. Cl. ........................................... 16/303; 16/330

(58) Field of Classification Search .................. 16/303, 16/330, 337–339, 342, 360, 361, 367, 362; 361/679.08, 679.11, 679.02, 679.15, 679.27; 455/90.3, 575.1, 575.3, 575.8; 379/433.12, 379/433.13; 348/373, 333.01, 333.06, 794

See application file for complete search history.

(56) References Cited

U.S. PATENT DOCUMENTS

| | | | | | |
|---|---|---|---|---|---|
| 5,715,575 | A | * | 2/1998 | Kubota | 16/342 |
| 5,966,776 | A | * | 10/1999 | Ona | 16/328 |
| 6,119,310 | A | * | 9/2000 | Ohshima et al. | 16/342 |
| 6,817,064 | B2 | * | 11/2004 | Kim et al. | 16/335 |
| 7,082,642 | B2 | * | 8/2006 | Su | 16/340 |
| 7,251,129 | B2 | * | 7/2007 | Lee et al. | 361/679.55 |
| 7,870,644 | B2 | * | 1/2011 | Chang | 16/337 |
| 7,958,600 | B2 | * | 6/2011 | Kuo et al. | 16/342 |
| 2007/0169312 | A1 | * | 7/2007 | Ho et al. | 16/330 |
| 2009/0235489 | A1 | * | 9/2009 | Chang et al. | 16/340 |
| 2010/0071156 | A1 | * | 3/2010 | Wang et al. | 16/297 |
| 2010/0293750 | A1 | * | 11/2010 | Chiang | 16/297 |

* cited by examiner

*Primary Examiner* — Chuck Y. Mah
(74) *Attorney, Agent, or Firm* — Altis Law Group, Inc.

(57) ABSTRACT

The embodiment includes a hinge, a pivot shaft, a cam, and a cam follower. The pivot shaft includes an engaging portion bound by two curved surfaces and two non-rotatable surfaces. The cam is non-rotatably sleeved on the engaging portion of the pivot shaft and defines a noncircular hole and two cutouts. The noncircular hole is bound by two first contact surfaces and two second contact surfaces. The second contact surfaces are tangent to the curved surfaces of the engaging portion of the pivot shaft. The cam follower is rotatably sleeved on the engaging portion of the pivot shaft and resists the cam. The cam follower forms two peaks engaging with the cutouts in the cam.

15 Claims, 5 Drawing Sheets

HINGE MECHANISM

This application claims all benefits accruing under 35 U.S.C. §119 from China Patent Application No. 201010131461.4, filed on Mar. 24, 2010 in the State Intellectual Property Office of the People's Republic of China, the contents of which are hereby incorporated by reference.

BACKGROUND

1. Technical Field

The present disclosure generally relates to hinge mechanisms, and more particularly to a hinge mechanism applied in an electronic device.

2. Description of Related Art

Many electronic devices include hinge mechanisms. A hinge mechanism generally includes a cam and a cam follower resisting the cam to ensure that one part is capable of rotating or being maintained at predetermined positions relative to the other. Thus, a changeable friction force is generated therebetween.

A commonly used hinge mechanism includes a pivot shaft, two frames, and two special purpose irregular washers resisting each other. One irregular washer forms two protrusions and the other irregular washer defines two cutouts engaging with the protrusions thereof. The frames and the irregular washers are sleeved on the pivot shaft. The main frame is connected to the display frame of the electronic device. The irregular washer with the protrusions defines a noncircular hole therein corresponding to the cross-section of the pivot shaft, and the irregular washer with the cutouts defines a substantially circular hole therein and forms a locking pole fixed to one of the frames. Therefore, the irregular washer with the protrusions rotates with the pivot shaft relative to the irregular washer with cutouts and the frame is fixed to the irregular washer with cutouts.

In use, the protrusion washer slides along the pivot shaft and resists different portions of the recess washer, and thereby, the resisting force along the axis direction of the pivot shaft is changed. However, since the shape and size of the noncircular hole in the irregular washer with protrusions is similar to that of the cross-section of the pivot shaft, the inner sidewalls of the noncircular hole have a relatively large contact surface with the pivot shaft, which prevents the irregular washer from sliding along the pivot shaft smoothly. Furthermore, the irregular washer and the pivot shaft are scraped severely.

Therefore, there is room for improvement within the art.

BRIEF DESCRIPTION OF THE DRAWINGS

The components in the drawings are not necessarily drawn to scale, the emphasis being placed upon clearly illustrating the principles of the present disclosure. Moreover, in the drawings, like reference numerals designate corresponding parts throughout several views, and all the views are schematic.

DETAILED DESCRIPTION

The present embodiment of a hinge may be applied in any electronic device with two or more hinged parts, such as notebook computers, LCD monitors, or DVD (digital video disc) players.

Figure 1:
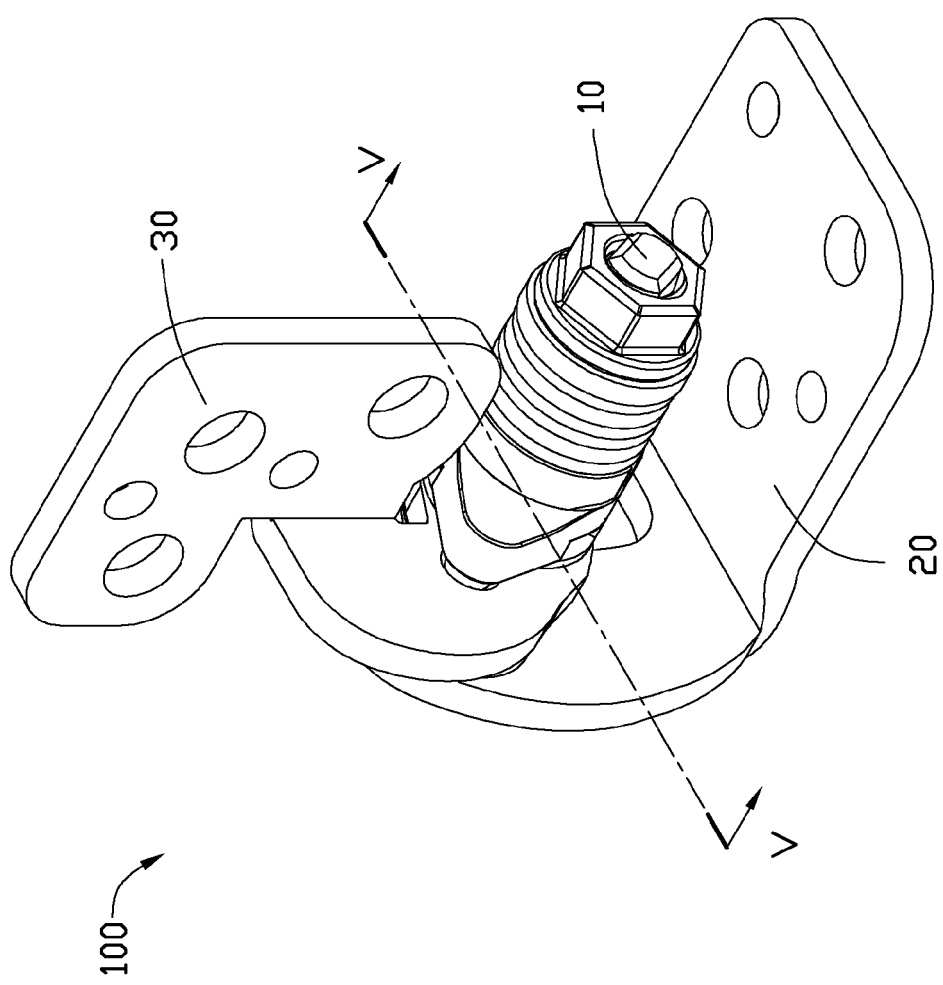
FIG. 1 is an assembled, isometric view of one embodiment of a hinge including a cam.
Figure 2:
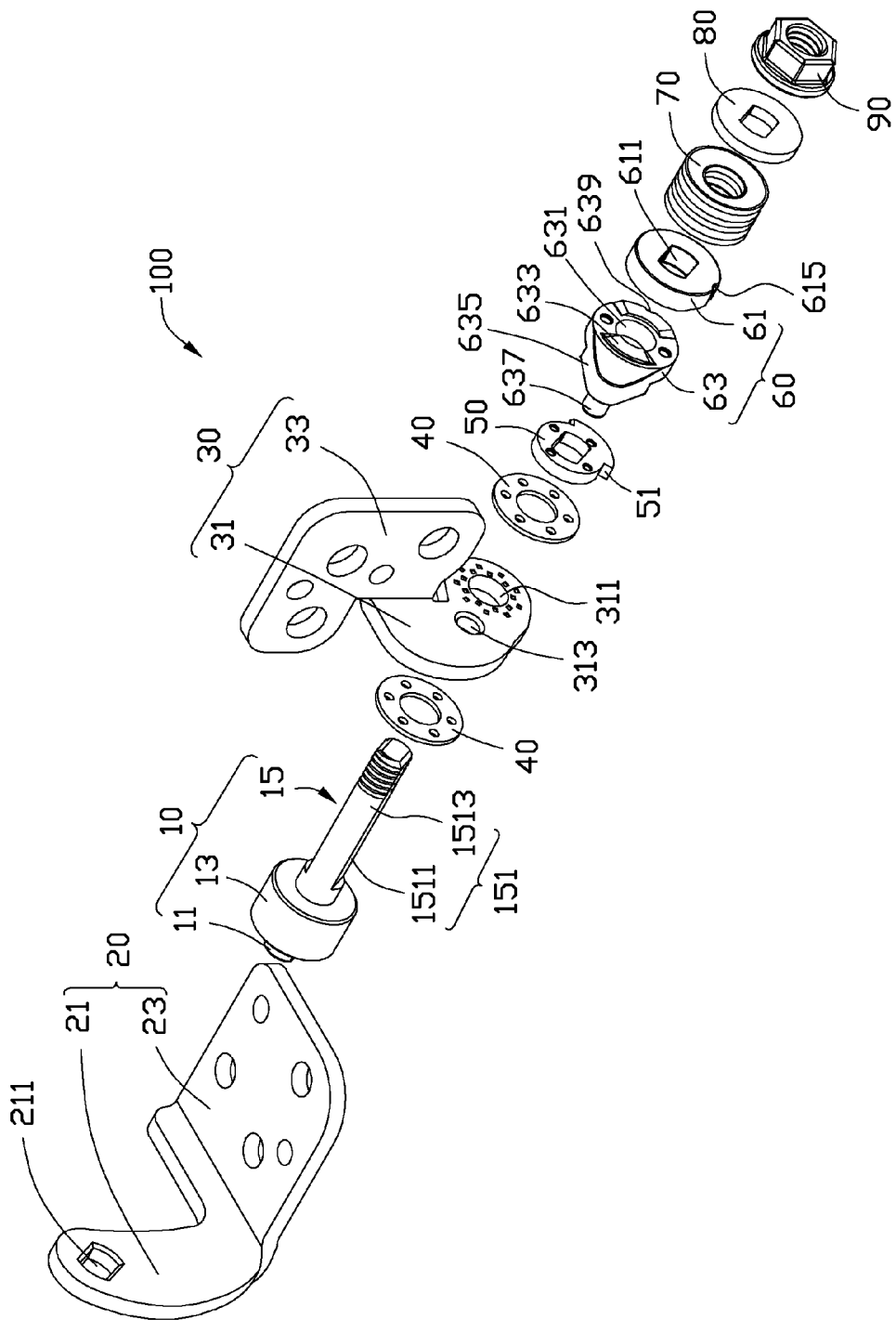
FIG. 2 is an exploded, isometric view of the hinge of FIG. 1.

Referring to FIGS. 1 and 2, a hinge 100 includes a pivot shaft 10, a first bracket 20, a second bracket 30, two flat washers 40, a restriction member 50, a resisting assembly 60, a resilient assembly 70, a friction washer 80, and a fastener 90 sleeved on the pivot shaft 10. The first bracket 20, the second bracket 30, the flat washers 40, the restriction member 50, the resisting assembly 60, the resilient assembly 70, the friction washer 80, and the fastener 90 are respectively sleeved on the pivot shaft 10.

The pivot shaft 10 includes a head portion 11, a flange 13, and an engaging portion 15. The head portion 11 and the engaging portion 15 are formed at opposite sides of the flange 13, and both the head portion 11 and the engaging portion 15 have noncircular cross-sections. The engaging portion 15 includes an exterior surface 151 bound by two non-rotatable surfaces 1511 and two curved surfaces 1513. The non-rotatable surfaces 1511 are formed in a manner opposing each other and the curved surfaces 1513 are also formed in a manner opposing each other. The pivot shaft 10 further has a threaded portion (not labeled) at a distal end of the engaging portion 15. Alternatively, the engaging portion 15 of the pivot shaft 10 may include one curved surface 1513 and three or more non-rotatable surfaces 1511, or include one curved surface 1513 and one non-rotatable surface 1511.

The first bracket 20 includes a sleeve portion 21 and a connection portion 23 bent from one end of the sleeve portion 21. The sleeve portion 21 defines a sleeve hole 211 with a shape and size similar to that of the cross-section of the head portion 11 of the pivot shaft 10. The connection portion 23 defines a number of assembly holes (not labeled) for connection to a part of an electronic device. In the illustrated embodiment, the sleeve portion 21 and the connection portion 23 are substantially plate-shaped and substantially perpendicular to each other.

The second bracket 30 includes a rotatable portion 31 and a fixing portion 33 bent from one end of the rotatable portion 31. The rotatable portion 31 defines a shaft hole 311 with a substantially circular shape and a restriction hole 313 adjacent to the shaft hole 311. The fixing portion 33 defines a number of assembly holes (not labeled) for connection to the other part of the electronic device. In the illustrated embodiment, both the rotatable portion 31 and the fixing portion 33 are plates and substantially perpendicular to each other.

Each flat washer 40 defines a central hole (not labeled) and a number of oil grooves (not labeled) adjacent to the central hole. The number of the flat washers 40 can be one or more than two.

The restriction member 50 forms an extended portion 51 extending from part of an edge thereof, and defines a noncircular hole (not labeled) in a central portion thereof.

The resisting assembly 60 includes a cam 61 and a cam follower 63 resisting each other.

Figure 3:
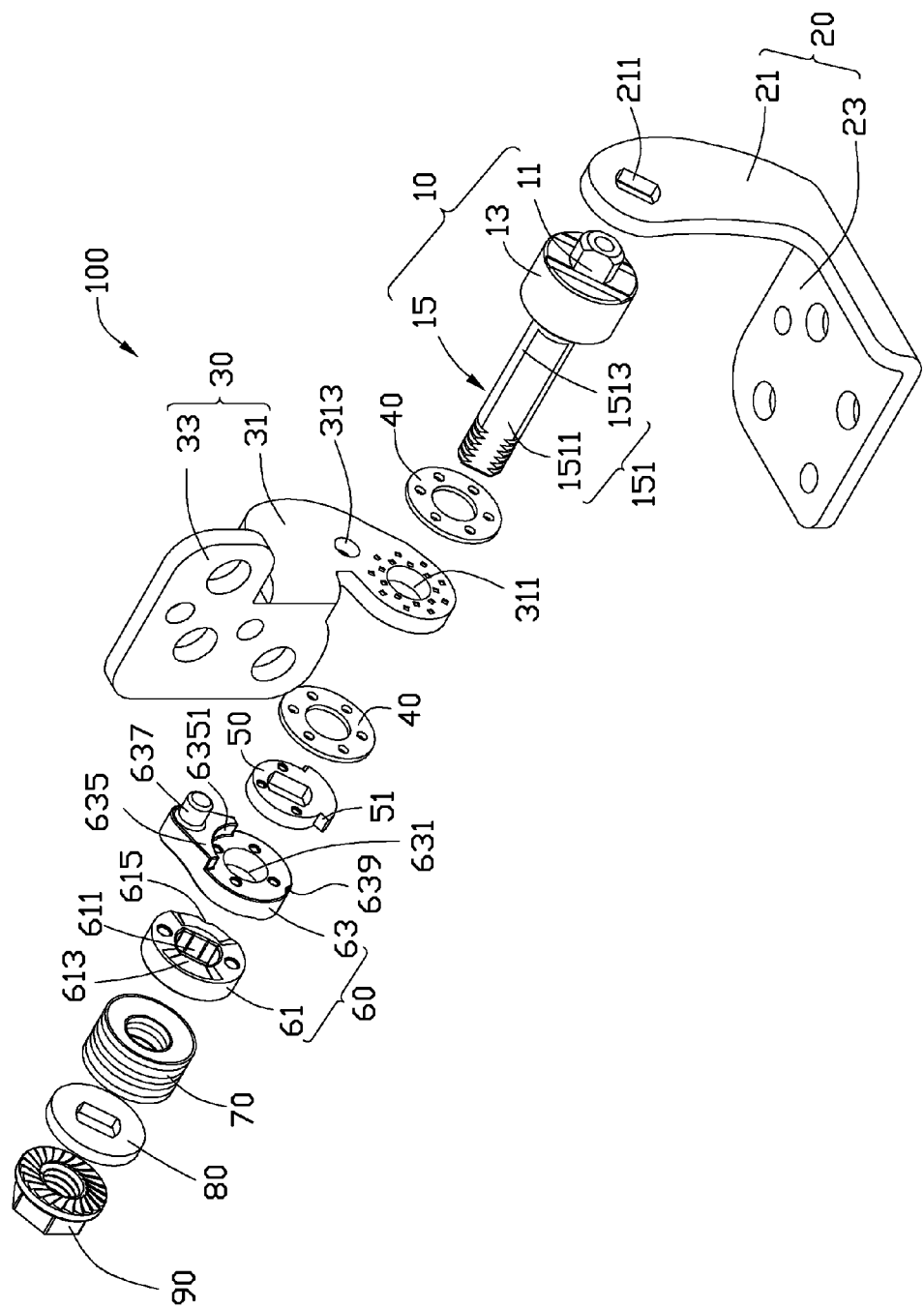
FIG. 3 is similar to FIG. 2, but viewed from another aspect.
Figure 4:
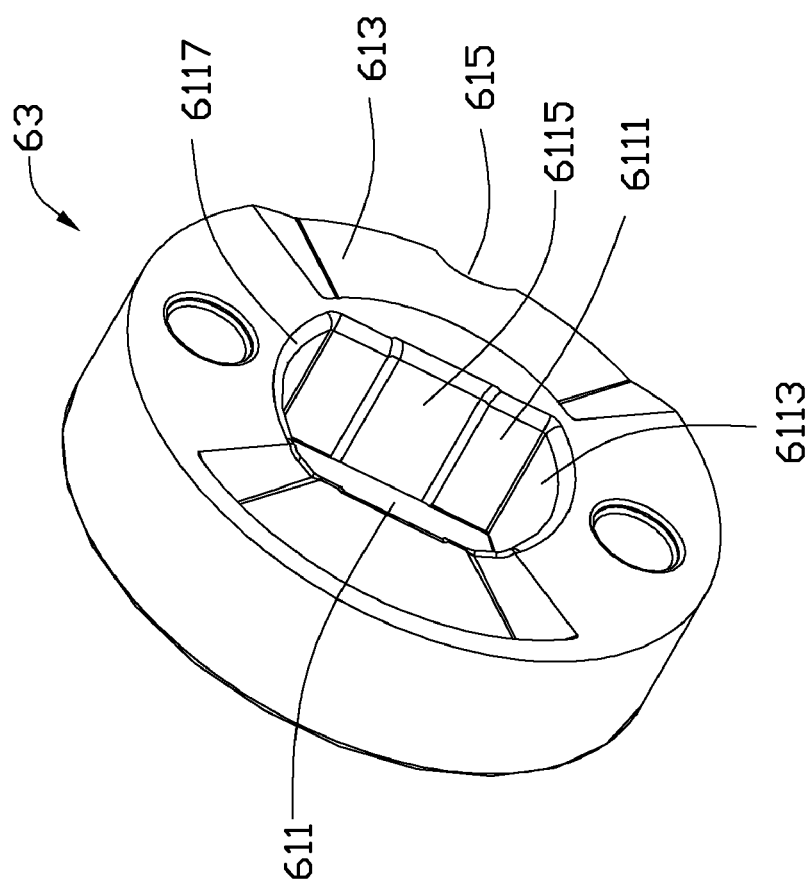
FIG. 4 is an isometric view of the cam utilized in the hinge of FIG. 1.
Figure 5:
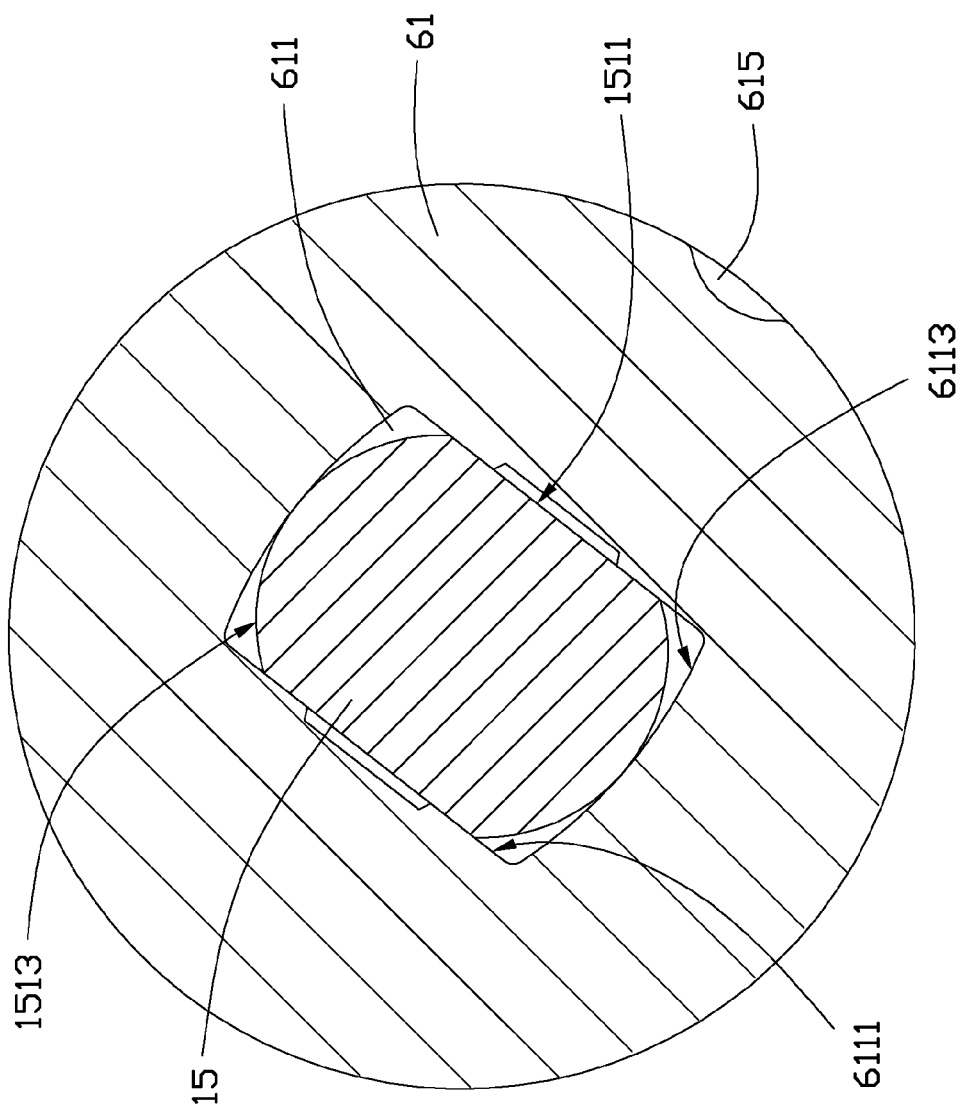
FIG. 5 is a cross-section of the hinge of FIG. 1, taken along line V-V.

Also referring to FIGS. 3 through 5, the cam 61 is cylindrical and defines a noncircular hole 611 at a central portion thereof, two cutouts 613 recessing from one end, and a first mistake-proof structure 615 recessing from an exterior side surface. The number of the cutouts 613 can be one or more than two.

The noncircular hole 611 is bound by two first contact surfaces 6111 opposing each other and two second contact surfaces 6113 opposing each other. The first contact surfaces 6111 correspond to the non-rotatable surfaces 1511 of the pivot shaft 10, and the second contact surfaces 6113 correspond to the curved surfaces 1513. That is, the first contact surfaces 6111 are flat, and the second contact surfaces 6113 are curved in the illustrated embodiment. The cam 61 defines two slots 6115 respectively recessing from two first contact surfaces 6111, and the cam 61 further forms a round-corner 6117 at a portion where the first contact surfaces 6111 and the second contact surfaces 6113 intersect at the end where the cutouts 613 recess. The curvature of the second contact surfaces 6113 is less than the curvature of the curved surfaces 1513 of the pivot shaft 10, such that the second contact surfaces 6113 are tangent to the curved surfaces 1513 when the pivot shaft 10 passes through the noncircular hole 611 of the cam 61. Therefore, each second contact surface 6113 provides a line-contact between the cam 61 and the pivot shaft 10.

Alternatively, the second contact surfaces 6113 may be wavy or partially spherical. The noncircular hole 611 may be bound by one second contact surface 6113 and three first contact surfaces 6111, or bound by one second contact surface 6113 and one first contact surface 6111 corresponding to the structure of the engaging portion 15 of the pivot shaft 10. The cam 61 can define multiple slots 6115 recessing from each first contact surface 6111.

A bottom surface (not labeled) of each cutout 613 is connected with an end surface (not labeled) from which the cutouts 613 are recessed with two slopes in a circumferential direction of the cam 61.

The cam follower 63 defines a central hole 631 which is substantially circular. The cam follower 63 forms two peaks 633 at one end opposing the cam 61, corresponding to the cutouts 613 in the cam 61. The cam follower 63 further forms a restriction block 635 at the other end of the cam follower 63 and a fixing pole 637 protruding from the restriction block 635. The cam follower 63 defines a second mistake-proof structure 639 recessing from the exterior side thereof corresponding to the first mistake-proofing structure 615 in the cam 61. A height of each peak 633 of the cam follower 63 is less than a depth of each cutout 613 in the cam 61. The restriction block 635 is formed adjacent to an edge of the cam follower 63 and defines an arched recess 6351. The distance from the side surface (not labeled) to the center of the cam follower 63 is greater than the distance from the edge of the restriction member 50 to the center thereof, but less than the distance from the extended portion 51 of the restriction member 50 to the center thereof, such that the restriction member 50 excepting the extended portion 51 is capable of rotating in the arched recess 6351. Thereby, the rotating range of the restriction member 50 is restricted. The number of the peaks 633 of the cam follower 63 corresponds to the number of the cutouts 613 in the cam 61. Alternatively, the first and the second mistake-proofing structures 615 and 639 can be protrusions or other structures instead.

The cam follower 63 can be omitted, and the peaks 633 are formed on the rotatable portion 31 of the second bracket 30 directly. That is, the cam 61 resists the rotatable portion 31 of the second bracket 30 directly. Also, the cam 60 can form peaks, and the element resisting the cam 60 defines cutouts to engage with the corresponding peaks of the cam 61.

The resilient assembly 70 includes a number of disk-shaped spring washers and which can be a compression spring. The friction washer 80 defines a central hole (not labeled) corresponding to the cross-section of the engaging portion 15 of the pivot shaft 10. The fastener 90 is a lock nut and can be a pin passing through the pivot shaft 10 in a radial direction thereof, and correspondingly, the distal end of the engaging portion 15 of the pivot shaft 10 defines a pin hole.

During assembly of the hinge 100, the head portion 11 of the pivot shaft 10 is inserted into the sleeve hole 211 of the first bracket 20, such that the pivot shaft 10 is non-rotatably connected with the first bracket 20. The engaging portion 15 is inserted through one flat washer 40, the second bracket 30, the other flat washer 40, the restriction member 50, the cam 61, the cam follower 63, the resilient assembly 70, the friction washer 80, and finally engaged with the fastener 90. The elements sleeved on the pivot shaft 10 resist each other tightly.

During the assembly process, the extended portion 51 of the restriction member 50 avoids the restriction block 635 and the fixing pole 637 of the cam follower 63. In addition, the mistake-proofing structure 615 in the cam 61 and the mistake-proofing structure 639 in the cam follower are respectively maintained. The fixing pole 637 of the cam follower 63 is received in the restriction hole 313 in the rotating portion 31 of the second bracket 30. The second contact surfaces 6113 of the noncircular hole 611 in the cam 61 contact the curved surfaces 1513 of the engaging portion 15 of the pivot shaft 10 by line-contact. Alternatively, the resisting assembly 60 can be positioned between the flange 13 of the pivot shaft 10 and the rotating portion 31 of the second bracket 30.

In use, the pivot shaft 10, the restriction member 50, the cam 61, the friction washer 80, and the fastener 90 rotate with the first bracket 20, and the cam follower 63 and the resilient assembly 70 rotate with the second stand 30. During the rotation process, the restriction member 50 rotates relative to the cam follower 63 but stops rotating when a side of the extended portion 51 is blocked by the restriction block 635. Thus, the first bracket 20 stops rotating relative to the second bracket 30. The rotation angle of the hinge 100 is restricted to a predetermined range by the engagement between the restriction member 50 and the cam follower 63.

In the hinge 100, the curved surfaces 1513 of the engaging portion 15 of the pivot shaft 10 are tangent to the second contact surfaces 6113 of the noncircular hole 611 of the cam 61. Furthermore, the non-rotatable surfaces 1511 of the engaging portion 15 partially contact the first contact surfaces 6111 of the noncircular hole 611 because of the slots 6115 in the noncircular hole 611. Therefore, the contact area between the pivot shaft 10 and the cam 61 is reduced, such that the friction force therebetween is reduced at the same time. The cam 61 is capable of sliding along the pivot shaft 10 smoothly and the cam 61 and the pivot shaft 10 is not easily abraded.

Because the height of each peak 633 of the cam follower 63 is less than the depth of each cutout 613 of the cam 61, the peaks 633 do not contact the bottom surface of the cutouts 613. Therefore, the peaks 633 and the bottom surfaces of the cutouts 613 do not easily abrade. Furthermore, the bottom surface 633 of each cutout 613 is connected with the end surface of the cam 61 in a circumferential direction of the cam 61 with the slopes, such that the peaks 633 of the cam follower 63 slide into or slide out of the cutouts 613 of the cam 61 smoothly and do not suddenly fall into the cutouts 613. Thus, an impact noise between the bottom surfaces of the cutouts 613 and the peaks 633 is avoided, and a better handle manipulation feeling can be achieved.

The first mistake-proofing structure 615 in the cam 61 and the second mistake-proofing structure 639 in the cam follower 63 can facilitate the assembly of the cam 61 and the cam follower 63 and thus improve the efficiency of the assembly process of the hinge 100.

Because of the round-corner 6117 formed in the cam 61, the pivot shaft 10 is passed easily through the noncircular hole 611 of the cam 61 and not easily scraped. Therefore, the assembly process is further improved.

The first bracket 20 and the second bracket 30 can be omitted, and two ends of the pivot shaft 10 are respectively inserted into two parts of the electronic device. Furthermore, the restriction block 635 of the cam follower 63 can have a greater size such that the cam follower 63 is capable of directly connecting with one part of the electronic device.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A hinge, comprising:
    a pivot shaft comprising an engaging portion, a cross-section of the engaging portion being bounded by at least one curved surface and at least one non-rotatable surface;
    a first bracket non-rotatably sleeved on the pivot shaft;
    a second bracket rotatably sleeved on the pivot shaft;
    a cam non-rotatably sleeved on the engaging portion of the pivot shaft and defines a noncircular hole according to a cross-section of the engaging portion, the noncircular hole bound by at least one first contact surface and at least one second contact surface;
    a cam follower rotatably sleeved on the engaging portion of the pivot shaft and resisting the cam, the cam follower being fixed to the second bracket; and
    a resilient assembly rotatably sleeved on the pivot shaft and resisting the cam toward the cam follower;
    wherein the at least one second contact surface is tangent to the at least one curved surface of the engaging portion of the pivot shaft; one of the cam and the cam follower defines at least one cutout and the other one of the cam and the cam follower forms at least one peak engaging with the at least one cutout.

2. The hinge of claim 1, wherein the at least one non-rotatable surface contacts the at least one first contact surface, and the cam defines at least one slot recessing from the at least one first contact surface of the noncircular hole of the cam.

3. The hinge of claim 2, wherein a curvature of the at least one curved surface is greater than the curvature of the at least one second contact surface of the noncircular hole in the cam.

4. The hinge of claim 3, wherein the cam forms a round-corner at a portion where the at least one first contact surface and the at least one second contact surface intersect each other, and the round-corner is located at an end of the cam.

5. The hinge of claim 4, wherein the at least one curved surface comprises two curved surfaces opposing each other and the at least one non-rotatable surface comprises two non-rotatable surfaces opposing each other, the at least one first contact surface comprises two first contact surfaces opposing each other and the at least one second contact surface comprises two second contact surfaces opposing each other.

6. The hinge of claim 1, wherein a height of the at least one peak is less than a depth of the at least one cutout.

7. The hinge of claim 6, wherein a bottom surface of the at least one cutout is connected with an end of the cam or the cam follower defining the at least one cutout by two slopes in a circumferential direction of the cam or the cam follower.

8. The hinge of claim 7, wherein the at least one peak is formed on the cam follower, and the cam defines said at least one cutout at an end opposing the cam follower.

9. The hinge of claim 1, further comprising a restriction member forming an extended portion extending from a part of an edge of the restriction member, wherein the cam follower forms a restriction portion defining an arched recess, and wherein a distance between a side surface and a center of the cam follower is greater than the distance between the edge and a center of the restriction member, but less than the distance between the extended portion of the restriction member and the center of the restriction member.

10. The hinge of claim 9, wherein the cam follower further forms a fixing pole extending from the restriction portion, and the first bracket defines a restriction hole engaging with the fixing pole.

11. The hinge of claim 10, wherein the pivot shaft further comprises a flange and a head portion; wherein the head portion and the engaging portion are formed on opposite ends of the flange; one of the first bracket and the second bracket is sleeved on the head portion, and the other of the first bracket and the second bracket is sleeved on the engaging portion.

12. The hinge of claim 1, further comprising a fastener engaging with one end of the pivot shaft.

13. A hinge, comprising:
    a pivot shaft comprising an engaging portion comprising at least one curved surface and at least one non-rotatable surface;
    a first bracket non-rotatably sleeved on the pivot shaft;
    a second bracket rotatably sleeved on the pivot shaft;
    a cam non-rotatably sleeved on the engaging portion and defining a noncircular hole bound by at least one first contact surface and at least one second contact surface, the at least one second contact surface contacting with the at least one curved surface by line-contact, the at least one first contact surface contacting with the at least one non-rotatable surface, and the cam further defining at least one slot recessing from the at least one first contact surface of the noncircular hole;
    a cam follower rotatably sleeved on the pivot shaft and fixed to the second bracket, and the cam follower resisting the cam; and
    a resilient assembly rotatably sleeved on the pivot shaft and resisting the cam toward the cam follower;
    wherein one of the cam and the cam follower defines at least one cutout, and the other one of the cam and the cam follower forms at least one peak engaging with the at least one cutout.

14. The hinge of claim 13, further comprising a restriction member non-rotatably sleeved on the engaging portion of the pivot shaft and opposing the cam follower, the restriction member forming an extended portion extending from a part of an edge of the restriction member, wherein the cam follower forms a restriction portion limiting the rotation angle of the extended portion.

15. The hinge of claim 13, wherein a height of the at least one of the peak is less than a depth of the at least one cutout.

* * * * *